(12) United States Patent
Hirota et al.

(10) Patent No.: US 7,620,236 B2
(45) Date of Patent: Nov. 17, 2009

(54) IMAGE PROCESSING METHOD AND APPARATUS

(75) Inventors: Makoto Hirota, Tokyo (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 10/900,191

(22) Filed: Jul. 28, 2004

(65) Prior Publication Data
US 2005/0024496 A1 Feb. 3, 2005

(30) Foreign Application Priority Data
Jul. 31, 2003 (JP) ............................. 2003-204673

(51) Int. Cl.
*G06K 9/00* (2006.01)
*G09G 5/00* (2006.01)

(52) U.S. Cl. ...................... 382/154; 345/619

(58) Field of Classification Search ............... 715/757; 345/619
See application file for complete search history.

(56) References Cited

U.S. PATENT DOCUMENTS

| | | | |
|---|---|---|---|
| 6,263,100 B1 | 7/2001 | Oshino et al. ............... 382/154 |
| 6,268,862 B1 | 7/2001 | Uchiyama et al. | |
| 6,445,807 B1* | 9/2002 | Katayama et al. ........... 382/100 |
| 6,628,820 B2* | 9/2003 | Oshino et al. ............... 382/154 |
| 6,774,898 B1 | 8/2004 | Katayama et al. ........... 345/428 |
| 6,864,903 B2* | 3/2005 | Suzuki ....................... 715/757 |
| 7,034,821 B2* | 4/2006 | Baumberg .................. 345/419 |
| 7,085,409 B2* | 8/2006 | Sawhney et al. ............ 382/154 |
| 7,106,361 B2* | 9/2006 | Kanade et al. .............. 348/159 |
| 7,120,313 B2* | 10/2006 | Kotake et al. ............... 382/282 |
| 7,149,345 B2* | 12/2006 | Fujiwara .................... 382/154 |
| 7,277,571 B2* | 10/2007 | Hara ......................... 382/154 |

(Continued)

FOREIGN PATENT DOCUMENTS

JP 9-245192 9/1997

(Continued)

OTHER PUBLICATIONS

Office Action in Japanese Patent Application No. 2003-204673, dated May 25, 2009.

(Continued)

*Primary Examiner*—Bhavesh M Mehta
*Assistant Examiner*—Soo Jin Park
(74) *Attorney, Agent, or Firm*—Fitzpatrick, Cella, Harper & Scinto

(57) ABSTRACT

An image processing method enables to reconstruct a new image viewed from set POV (point of view) position and direction without increasing a communication amount. To do so, in the image processing method of reconstructing the new image at a POV position where no actual photographing is performed, from among plural images respectively photographed at different POV positions, there are provided a setting step of setting POV position/direction information; a transmission step of transmitting the set POV position/direction information to plural photographing devices; a reception step of receiving effective pixel information of images according to the POV position/direction information respectively from the plural photographing devices; and a reconstruction step of reconstructing the new image based on the received effective pixel information, wherein the photographing device extracts a effective pixel from the photographed image, on the basis of the POV position/direction information.

10 Claims, 10 Drawing Sheets

U.S. PATENT DOCUMENTS

| | | |
|---|---|---|
| 2002/0126913 A1 | 9/2002 | Kotake et al. |
| 2002/0158873 A1* | 10/2002 | Williamson ................. 345/427 |
| 2003/0122949 A1 | 7/2003 | Kanematsu et al. |
| 2004/0104935 A1* | 6/2004 | Williamson et al. ......... 345/757 |

FOREIGN PATENT DOCUMENTS

| | | |
|---|---|---|
| JP | 9-261537 | 10/1997 |
| JP | 10-27264 | 1/1998 |
| JP | 2002-157603 | 5/2002 |
| JP | 2003-143505 | 5/2003 |
| WO | 02/39716 | 5/2002 |

OTHER PUBLICATIONS

Steven Seitz et al., "View Morphing," SIGGRAPH 96 (1996), pp. 21-30.

* cited by examiner

IMAGE PROCESSING METHOD AND APPARATUS

This application claims priority from Japanese Patent Application No. 2003-204673 filed on Jul. 31, 2003, which is hereby incorporated by reference herein.

BACKGROUND OF THE INVENTION

1. Field of the Invention

The present invention relates to image processing method and apparatus for reconstructing, based on images photographed by lots of cameras, an image viewed from established point of view (hereinafter called POV) and direction.

2. Related Background Art

A conventional digital camera merely photographs an image which is viewed from the position where it is set up, whereby it is impossible by the conventional digital camera to reconstruct an image which is viewed from a position different from the position where the camera is set up. Meanwhile, in a CG (computer graphics) field, a technique called image-based rendering by which an image of an arbitrary POV is generated from lots of images has been investigated.

Hereinafter, a method of reconstructing the image of the arbitrary POV from the lots of images through the image based rendering will be explained. For convenience of explanation, a camera model as shown in FIG. 9 is provided. That is, in FIG. 9, the range expanding between the dotted lines centering around the camera position (POV position) is an angle of view, the pixel positioned at the intersection point between the image constitution surface and the beam from the subject shows a color corresponding to the beam, and a gathering of such pixels constitutes the entire image photographed by the digital camera. FIG. 10 is a diagram for explaining the existing image based rendering technique on the basis of the camera model shown in FIG. 9. In FIG. 10, symbols (A), (B), (C) and (D) respectively denote actual camera photographing positions (also simply called cameras (A), (B), (C) and (D)), and symbol (X) denotes a virtual camera POV position at which camera photographing is not actually performed (also simply called virtual camera (X)). Here, if it is assumed that the color of the pixels on the beam between the POV position of the virtual camera (X) and the POV position of the camera (B) is the same (that is, any beam attenuation or the like does not occur), the color of a pixel x2 and the color of a pixel b2 are sure to become the same, whereby the pixel x2 can be inferred resultingly from the pixel b2. Likewise, a pixel x1 can be inferred from a pixel c1 of the camera (C). In the same way, an image of the virtual camera POV position (X) at which the camera photographing is not actually performed can be inferred by gathering pixel information in the photographed images from the various POV positions. Incidentally, in case of the POV position and direction of the camera (A) or (D), the beam between the POV position of the virtual camera (X) and the POV position of the camera1 (A) or (D) is outside the range of the angle of view of the virtual camera (X), whereby there is no pixel capable of being used to reconstruct the image viewed from the virtual camera (X). For this reason, it is necessary to photograph lots of images viewed from the POV positions and directions, such as the POV positions and directions of the cameras (B) and (C), within the range of angle of view of the virtual camera (X).

For this reason, in the above conventional technique, lots of the photographed images are all stored once in a memory and then processed, whereby a vast capacity is necessary for the memory. On the other hand, when lots of images are photographed by using a single camera, it is necessary to photograph these images as changing one by one the POV position and direction of the camera, whereby there is a problem that it takes a long time for image photographing. Besides, there is a problem that an animation cannot be reproduced based on the images photographed by the single camera. To cope with this problem, a method of disposing lots of cameras on a network, simultaneously photograph images by these cameras, and process the lots of photographed images by using a server computer is devised. However, in that case, it is necessary to transmit lots of data of the photographed images to the server computer, whereby there is a problem that a load of the network becomes huge.

SUMMARY OF THE INVENTION

An object of the present invention is to solve the above problems.

In order to achieve the above object, the present invention as recited in claim 1 is characterized by an image processing method of reconstructing a new image at a POV (point of view) position where no actual photographing is performed, from among plural images respectively photographed at different POV positions, comprising: a setting step of setting POV position/direction information; a transmission step of transmitting the POV position/direction information set in the setting step to plural photographing devices; a reception step of receiving effective pixel information of images according to the POV position/direction information respectively from the plural photographing devices; and a reconstruction step of reconstructing the new image based on the effective pixel information received in the reception step, wherein the photographing device extracts a effective pixel from the photographed image, on the basis of the POV position/direction information.

Further, the present invention as recited in claim 5 is characterized by an image processing method of reconstructing a new image at a POV position where no actual photographing is performed, from among plural images respectively photographed at different POV positions, comprising: a setting step of setting POV position/direction information; a holding step of holding information of respective positions and directions of plural cameras connected through a network; a selection step of selecting the camera having an effective pixel necessary to reconstruct the new image, based on the POV position/direction information set in the setting step; a transmission step of transmitting, to the camera selected in the selection step, effective pixel position information of the selected camera; a reception step of receiving the effective pixel information of the images according to the POV position/direction information respectively from the plural cameras; and a reconstruction step of reconstructing the new image based on the effective pixel information received in the reception step.

Other objects and features of the present invention will be apparent from the following description in conjunction with the accompanying drawings.

DETAILED DESCRIPTION OF THE PREFERRED EMBODIMENTS

First Embodiment

Hereinafter, the first embodiment of the present invention will be explained in detail with reference to the attached drawings.

Figure 1:
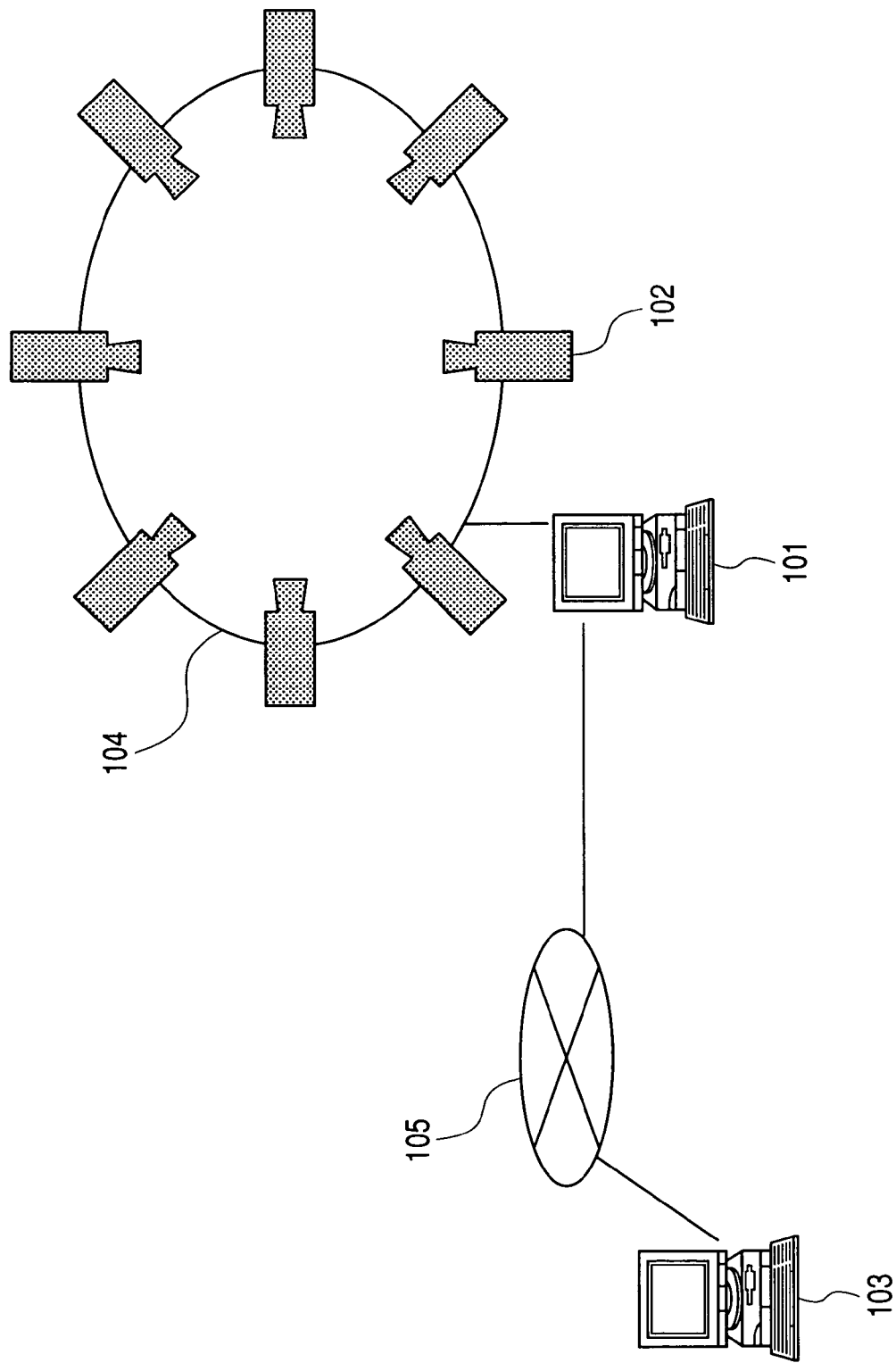
FIG. 1 is a diagram showing the structure of a system according to the embodiment of the present invention.

In the present embodiment, as shown in FIG. 1, it is assumed that lots of network-connected cameras are disposed in a place such as a stadium or the like, a user determines desired POV (point of view) position and direction, the user causes a client computer to transmit information representing the desired POV position and direction a server computer, the server computer generates based on the transmitted information a still image viewed from the desired POV position and direction by performing predetermined interactions with the disposed cameras, and the server computer returns the generated still image to the client computer.

In FIG. 1, numeral 101 denotes a server computer, numeral 102 denotes a digital camera having a communication function, numeral 103 denotes a client computer, numeral 104 denotes a LAN for connecting lots of the cameras to the server computer 101, and numeral 105 denotes the Internet.

Figure 2:
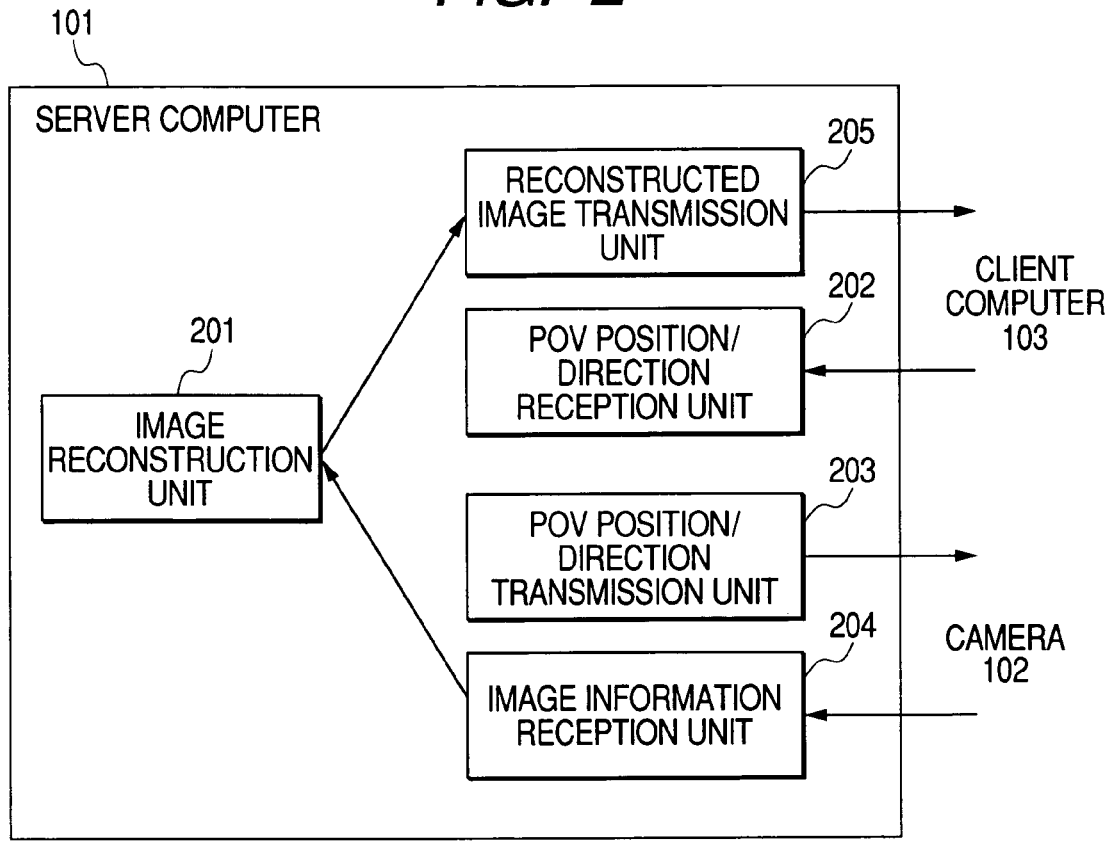
FIG. 2 is a block diagram showing a server computer 101 according to the embodiment of the present invention.

FIG. 2 is a block diagram showing the server computer 101 according to the present embodiment. In FIG. 2, numeral 201 denotes an image reconstruction unit which constitutes an image of the set POV position and direction, and numeral 202 denotes a POV position/direction reception unit which receives POV position/direction information (i.e., the information representing the POV position and direction desired by the user) from the client computer 103 through the Internet 105. Numeral 203 denotes a POV position/direction transmission unit which transmits the POV position/direction information received by the POV position/direction reception unit 202 simultaneously to lots of digital cameras including the digital camera 102 through the LAN 104, and numeral 204 denotes a pixel information reception unit which receives pixel information of various pixel positions from lots of the digital cameras including the digital camera 102 through the LAN 104. Numeral 205 denotes a reconstructed image transmission unit which transmits the image information reconstructed by the image reconstruction unit 201 to the client computer 103 through the Internet 105.

Figure 3:
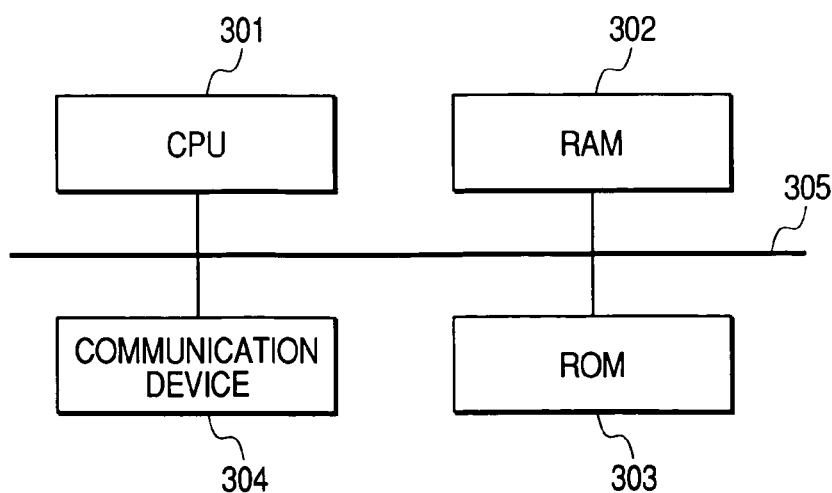
FIG. 3 is a block diagram showing the hardware structure of the server computer 101 according to the embodiment of the present invention.

FIG. 3 is a block diagram showing the hardware structure of the server computer 101 according to the present embodiment. In FIG. 3, numeral 301 denotes a CPU which operates according to a program for achieving a later-described procedure, and numeral 302 denotes a RAM which provides a storage area necessary for the operation based on the program. Numeral 303 denotes a ROM which stores the program for achieving the later-described procedure, numeral 304 denotes a communication device which is connected to the LAN 104 and the Internet 105 and performs communication to the client computer 103, and digital camera 102 and the like, and numeral 305 denotes a bus through which necessary data are transmitted.

Figure 4:
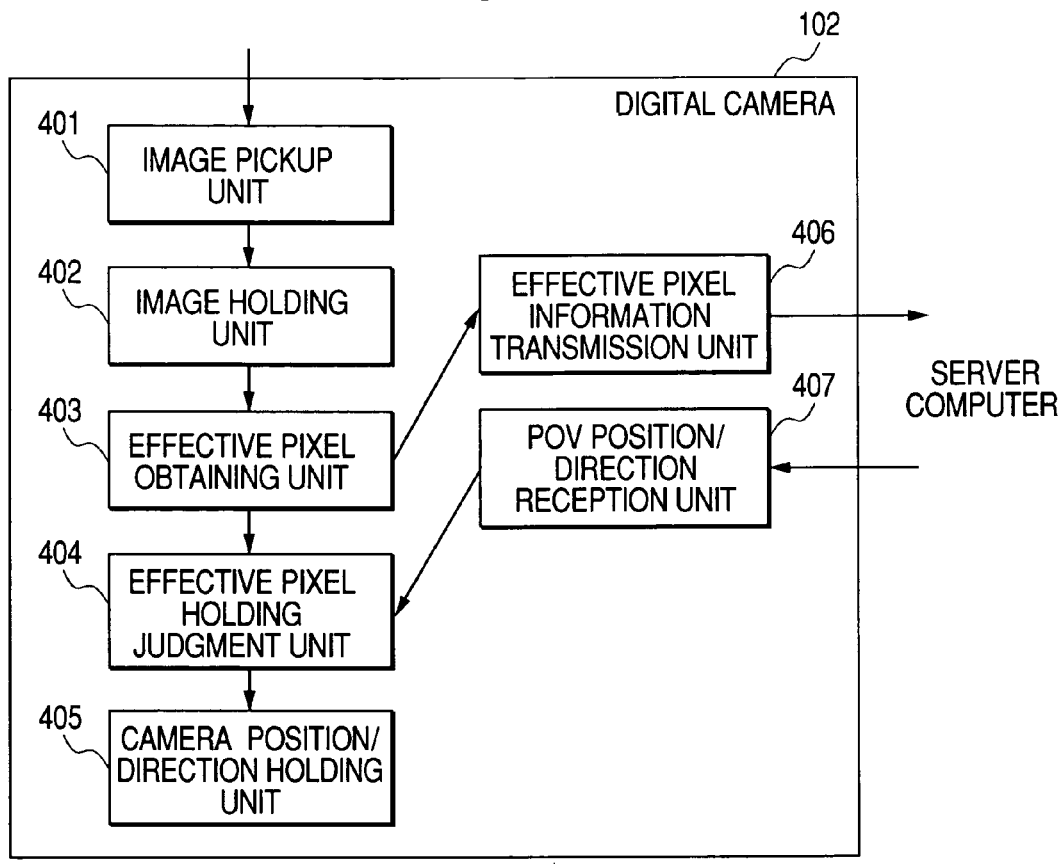
FIG. 4 is a block diagram showing a digital camera 102 according to the embodiment of the present invention.

FIG. 4 is a block diagram showing the digital camera 102 according to the present embodiment. In FIG. 4, numeral 401 denotes an image pickup unit, and numeral 402 denotes an image holding unit which holds and stores image data obtained by photographing an image. Numeral 403 denotes an effective pixel obtaining unit which extracts the pixel information effective for the server computer to reconstruct the image of the set POV position and direction from the image information transferred from the image pickup unit 401. Numeral 404 denotes an effective pixel holding judgment unit which judges whether or not the image information transferred from the image pickup unit 401 include the pixel information effective for the server computer to reconstruct the image of the set POV position and direction. Numeral 405 denotes a camera position direction holding unit which holds information concerning the position and direction of the digital camera 102 itself, and numeral 406 denotes an effective pixel information transmission unit which transmits the pixel information obtained by the effective pixel obtaining unit 403 to the server computer 101 through the LAN 104. Numeral 407 denotes a POV position/direction reception unit which receives the set POV position/direction information from the server computer 101 through the LAN 104.

Figure 5:
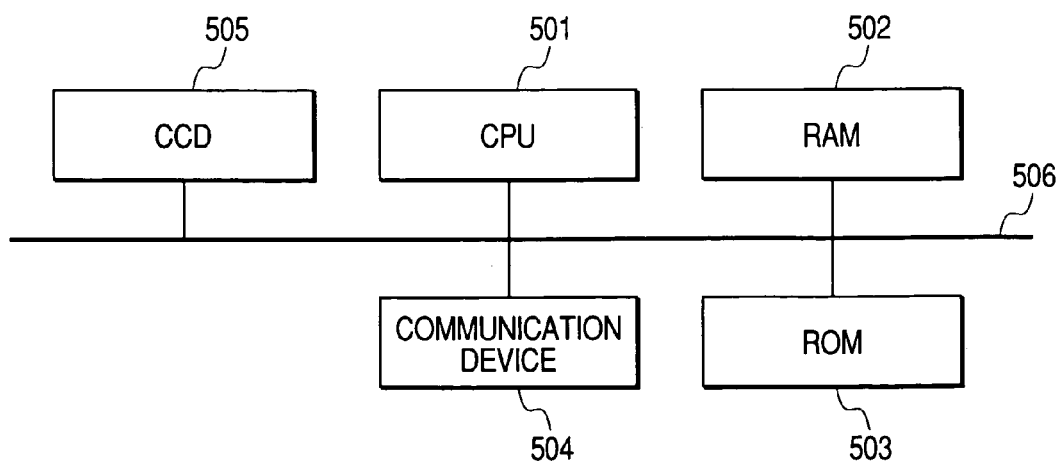
FIG. 5 is a block diagram showing the hardware structure of the digital camera 102 according to the embodiment of the present invention.

FIG. 5 is a block diagram showing the hardware structure of the digital camera 102 according to the present embodiment. In FIG. 5, numeral 501 denotes a CPU which operates according to a program for achieving a later-described procedure, and numeral 502 denotes a RAM which provides a storage area necessary for the operation based on the program. Moreover, the image holding unit 402 holds and stores the obtained image data on the RAM 502. Numeral 503 denotes a ROM which stores the program for achieving the later-described procedure, and numeral 504 denotes a communication device which is connected to the LAN 104 and performs communication to the server computer 101. Numeral 505 denotes a CCD which obtains an external image, and numeral 506 denotes a bus through which necessary data are transmitted.

Figure 6:
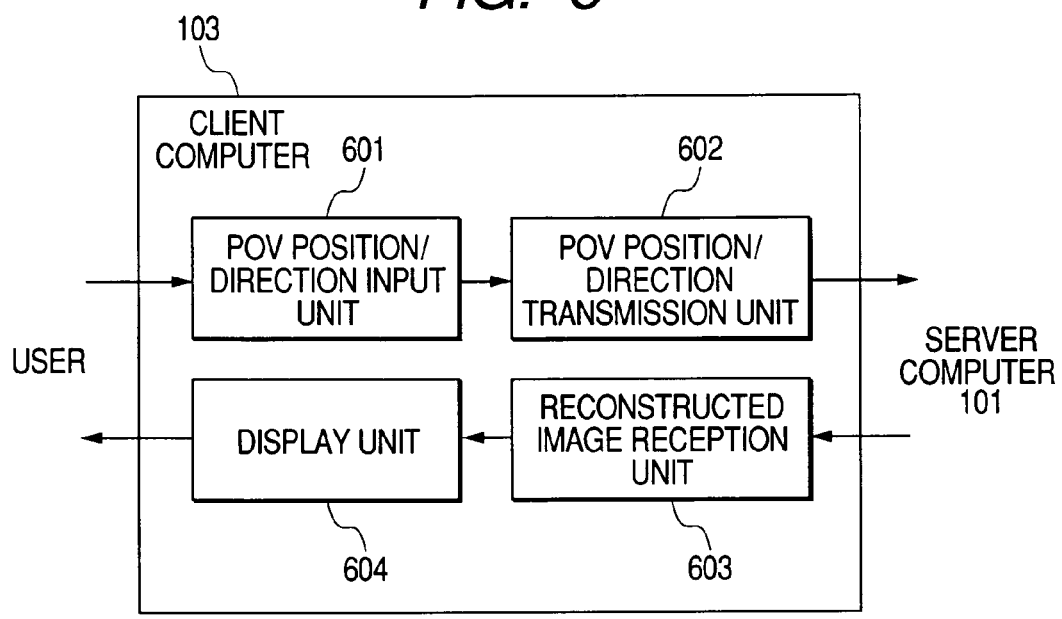
FIG. 6 is a block diagram showing a client computer 103 according to the embodiment of the present invention.

FIG. 6 is a block diagram showing the client computer 103 according to the present embodiment. In FIG. 6, numeral 601 denotes a POV position/direction input unit through which the user inputs desired POV position and direction, and numeral 602 denotes a POV position/direction transmission unit which transmits the input POV position/direction information to the server computer 101 through the Internet 105. Numeral 603 denotes a reconstructed image reception unit which receives the image information reconstructed by the server computer 101 through the Internet 105, and numeral 604 denotes a display unit which causes a display to display an image based on the image information received by the reconstructed image reception unit 603.

Figure 7:
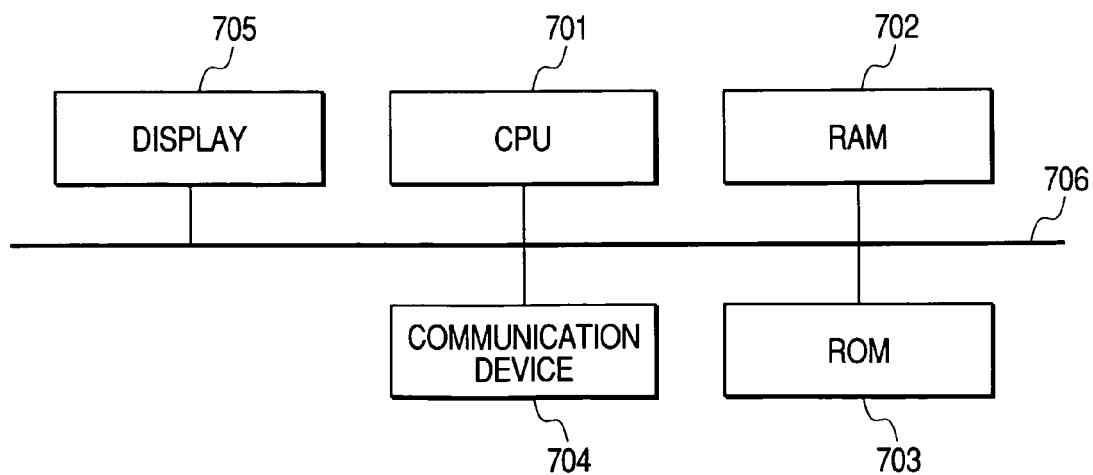
FIG. 7 is a block diagram showing the hardware structure of the client computer 103 according to the embodiment of the present invention.

FIG. 7 is a block diagram showing the hardware structure of the client computer 103 according to the present embodiment. In FIG. 7, numeral 701 denotes a CPU which operates according to a program, and numeral 702 denotes a RAM which provides a storage area necessary for the operation based on the program. Numeral 703 denotes a ROM which stores the program, and numeral 704 denotes a communication device which is connected to the Internet 105 and performs communication to the server computer 101. Numeral 705 denotes a display which displays the reconstructed image, and numeral 706 denotes a bus through which necessary data are transmitted.

Hereinafter, an operation of the server computer 101 and an operation of the digital camera 102 according to the present embodiment will be explained with reference to a flow chart shown in FIG. 8. First, the server computer 101 obtains the POV position/direction information of the image intended to be generated, from the client computer 103 (step S801). Here, the POV position is the three-dimensional position (x, y, z) of the POV, and the POV direction is the direction (θ, Φ) from the POV. Besides, the POV position and direction is a set of the POV position and the POV direction which is desired by the user and designated by the user on the client computer 103. Then, the server computer 101 transmits the POV position/direction information (x, y, z, θ, Φ) to lots of the cameras including the digital camera 102 (step S802).

When the POV position/direction information (x, y, z, θ, Φ) transmitted from the server computer 101 is received by the POV position/direction reception unit 407 of the digital camera 102 (step S808), the effective pixel holding judgment unit 404 judges whether or not the pixel information effective to reconstruct the image of the POV position and direction is included in the image photographed by the digital camera 102 itself (step S809).

Figure 10:
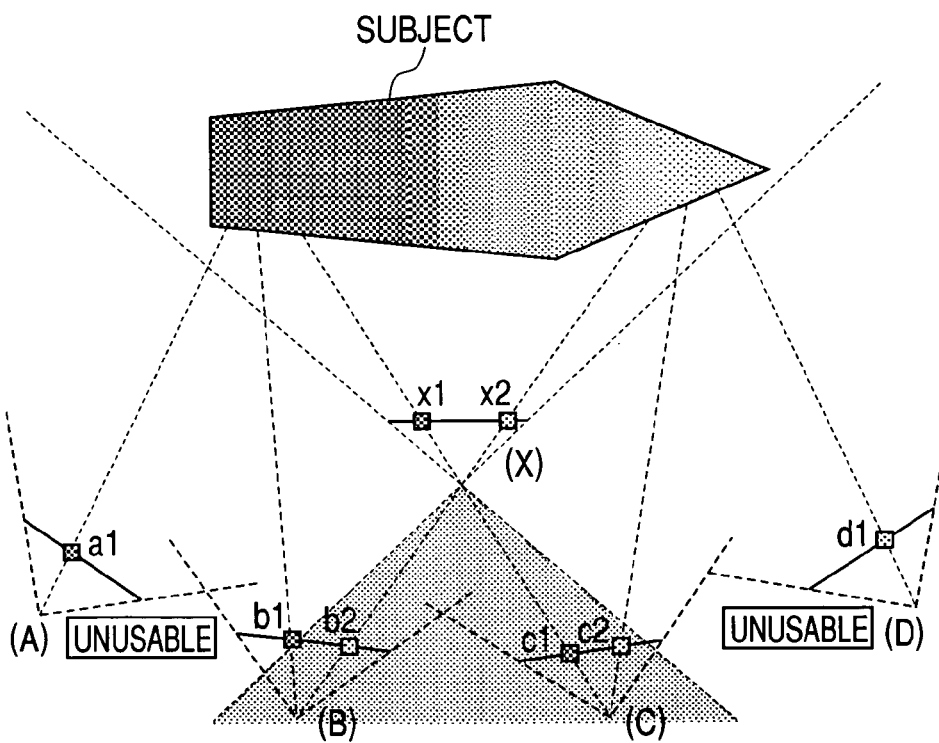
FIG. 10 is a diagram for explaining a principle of reconstructing an image of set POV position and direction from plural cameras according to the embodiment of the present invention.

Incidentally, POV position/direction information (x1, y1, z1, θ1, Φ1) of the digital camera 102 has been previously stored in the effective pixel holding judgment unit 404 of the digital camera 102. Therefore, the effective pixel holding judgment unit 404 performs the above judgment based on the principle explained with reference to FIG. 10, by using the POV position/direction information (x1, y1, z1, θ1, Φ1) of the digital camera 102 and the POV position/direction information (x, y, z, θ, Φ) of the image received by the POV position/direction reception unit 407.

That is, if the line extending between the POV position (x, y, z) and the POV position (x1, y1, z1) is included in both the angle of view of the virtual camera (X) indicated by the set POV position and direction and the angle of view of the digital camera 102 itself, it is judged that the pixel information effective to reconstruct the image of the POV position and direction is included in the image photographed by the digital camera 102 itself.

Meanwhile, if it is judged that the pixel information effective to reconstruct the image of the POV position and direction is not included in the image photographed by the digital camera 102 itself, the flow returns to the step S808. Then, if it is judged that the pixel information effective to reconstruct the image of the POV position and direction is included in the image photographed by the digital camera 102, the effective pixel obtaining unit 403 extracts the pixel information effective for the server computer to reconstruct the image of the set POV position and direction (simply called effective pixel information or color information) from the image holding unit 402 in which the image data obtained by the image pickup unit 401 has been stored (step S810), and then the effective pixel information transmission unit 406 transmits the obtained effective pixel information to the server computer 101 through the LAN 104.

In the present embodiment, it is unnecessary to transmit the entire image photographed by the digital camera 102 but it is necessary to transmit only the necessary pixel information, whereby a communication amount can be reduced.

When the pixel information from the digital camera 102 (i.e., lots of the cameras including the digital camera 102) is received by the pixel information reception unit 204 (step S803), the server computer 101 reflects the received pixel information on the corresponding pixel on the reconstructed image by using the image reconstruction unit 201 (step S804). For example, in FIG. 10, when pixel information b2 is received from the camera (B), the received information is copied to a pixel x2. After then, an image reconstruction end condition is judged (step S805). Thus, if the end condition is satisfied, a post-process is performed (step S806), and the reconstructed image (data) is transmitted to the client computer 103 through the Internet 105. Here, the end condition is judged by judging whether or not the pixel information sufficient to reconstruct the image has been accumulated from lots of the cameras including the digital camera 102, and more simply, by judging whether or not the image information for all pixel positions can be obtained. Alternatively, even if the image information for all the pixel positions cannot be obtained, the end condition is satisfied when it is judged to be able to infer the image information for all the pixel positions by some kind or another interpolation process. Here, when it is premised that the interpolation process is performed, it is performed in the post-process of the step S806.

After then, the reconstructed image (data) is transmitted from the reconstructed image transmission unit 205 to the client computer 103 through the Internet 105.

Second Embodiment

In the first embodiment, the still image viewed from the POV position and direction desired by the user is reconstructed and transmitted to the client computer. On the other hand, in the present embodiment, a method of reconstructing a moving image (or an animation) viewed from the POV position and direction desired by the user will be explained.

In the present embodiment, a video camera capable of shooting a moving image is used as the digital camera 102, and the data of the shot moving image is recorded as a gathering of the still images at an arbitrary time T. Then, in a step S811 of the flow chart shown in FIG. 8, information (X, Y, R, G, B, T) which includes pixel position information (X, Y), color information (R, G, B) and shooting time information (T) as the effective pixel information at the arbitrary time T is transmitted from the digital camera 102 to the server computer 101. This operation is performed with respect to each of the continuously changed arbitrary times T. Then, in the step S804, the server computer 101 gathers, from among the received effective pixel information (X, Y, R, G, B, T), the effective pixel information of which the time information (T) is the same as one image, thereby reconstructing the still image at the time T. Meanwhile, if the end condition is satisfied, the process ends in the video camera (digital camera) 102 (step S812).

In any case, when the gathered pixel information having the time information (T) satisfies the image reconstruction end condition in the step S805, the necessary post-process such as the interpolation process is performed by the server computer 101 (step S806). Then, the reconstructed and obtained image information is transmitted as the image at the time T to the client computer 103 (step S807). This operation is performed with respect to each of the continuously changed arbitrary times, whereby resultingly the moving image viewed from the set POV position and direction can be reconstructed and generated.

Third Embodiment

In the above first and second embodiments, the image reconstruction from the desired POV position and direction is requested from one client computer, i.e., one user. Meanwhile, in the present embodiment, it is possible for plural users to request the image reconstruction from the desired POV position and direction.

That is, in a case where the POV position/direction information set from a user A (not shown) is transmitted from the server computer 101 to the digital camera 102, the server computer 101 adds a user identifier A to the POV position/direction information (x, y, z, θ, Φ). Thus, the obtained POV position/direction information (x, y, z, θ, Φ, A) is transmitted to the digital camera 102. When the POV position/direction information (x, y, z, θ, Φ, A) is received, the digital camera 102 adds the user identifier A to the effective pixel information to be transmitted, and then sends back the obtained information to the server computer 101. Subsequently, the server computer 101 gathers the effective pixel information including the same user identifier A, generates the image based on the gathered effective pixel information, and then transmits the reconstructed image to the client computer of the user A. Therefore, in the case where there are the plural users requesting the image reconstruction from the desired POV position and direction, it is possible to transmit the reconstructed image to these users.

Fourth Embodiment

In the above embodiments, the server computer broadcasts the set POV position and direction to lots of the digital cameras, each camera judges in response to the sent information whether or not the camera itself includes the effective pixel, and then the cameras which judged to include the effective pixel send back the effective pixel information to the server computer 101. On the other hand, in the present embodiment, the camera including the effective pixel is previously discriminated and selected by the server computer 101.

Figure 11:
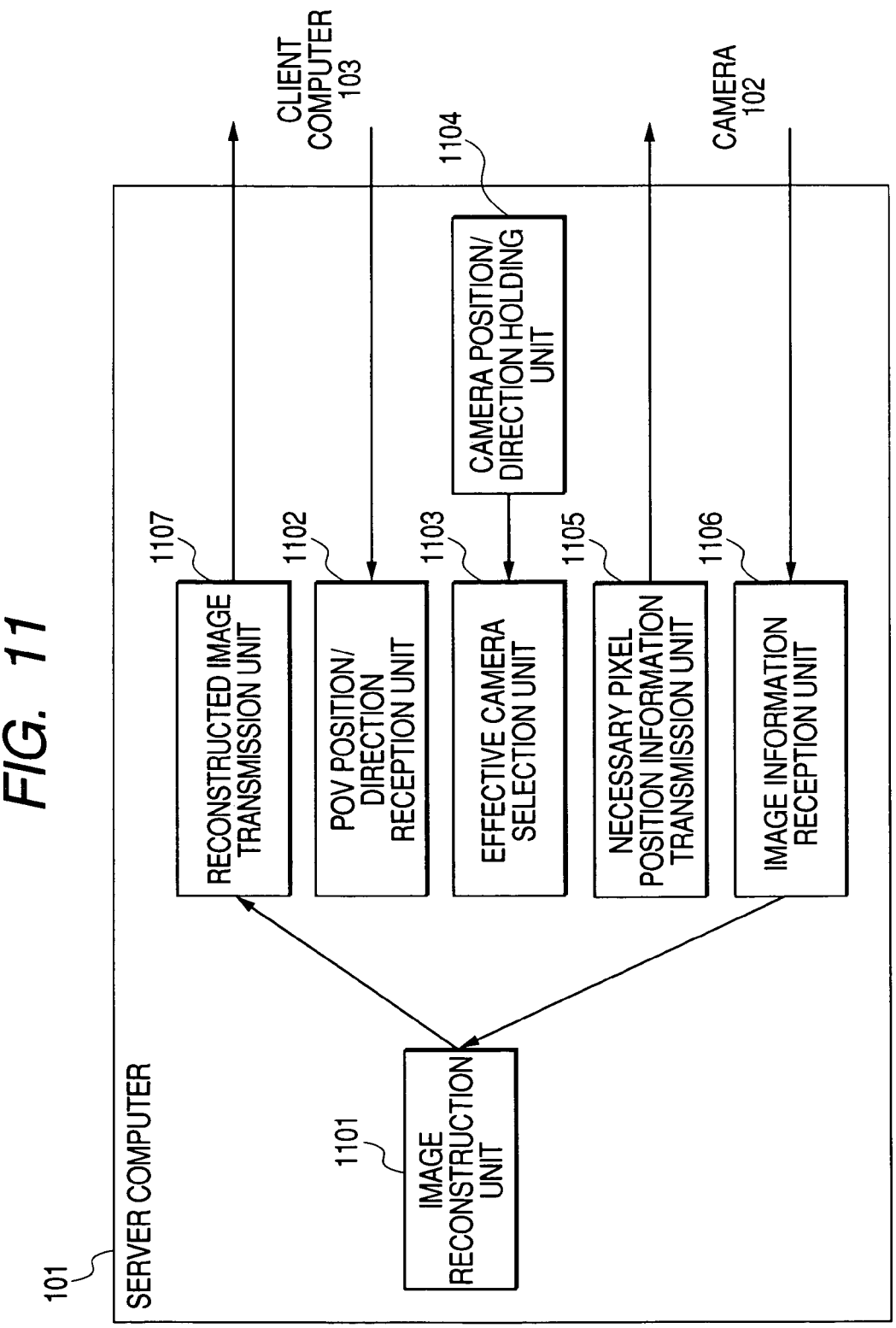
FIG. 11 is a block diagram showing a server computer 101 according to the fourth embodiment of the present invention.

FIG. 11 is a block diagram showing the server computer 101 according to the fourth embodiment. In FIG. 11, numeral 1101 denotes an image reconstruction unit which constitutes an image of the set POV position and direction, and numeral 1102 denotes a POV position/direction reception unit which receives user's desired POV position/direction information from the client computer 103 through the Internet 105. Numeral 1103 denotes an effective camera selection unit which discriminates and selects, from among lots of the cameras, the camera including the pixel effective for the set POV position and direction (this camera is also called an effective camera), and numeral 1104 denotes a camera position/direction holding unit which holds or stores information concerning the positions and directions of the respective cameras. Numeral 1105 denotes a necessary pixel position information transmission unit which transmits position information concerning the effective pixel for the set POV position and direction to each camera selected by the effective camera selection unit 1103. Numeral 1106 denotes a pixel information reception unit which receives pixel information of various pixel positions from lots of the digital cameras including the digital camera 102 through the LAN 104, and numeral 1107 denotes a reconstructed image transmission unit which transmits the image information reconstructed by the image reconstruction unit 1101 to the client computer 103 through the Internet 105.

Figure 12:
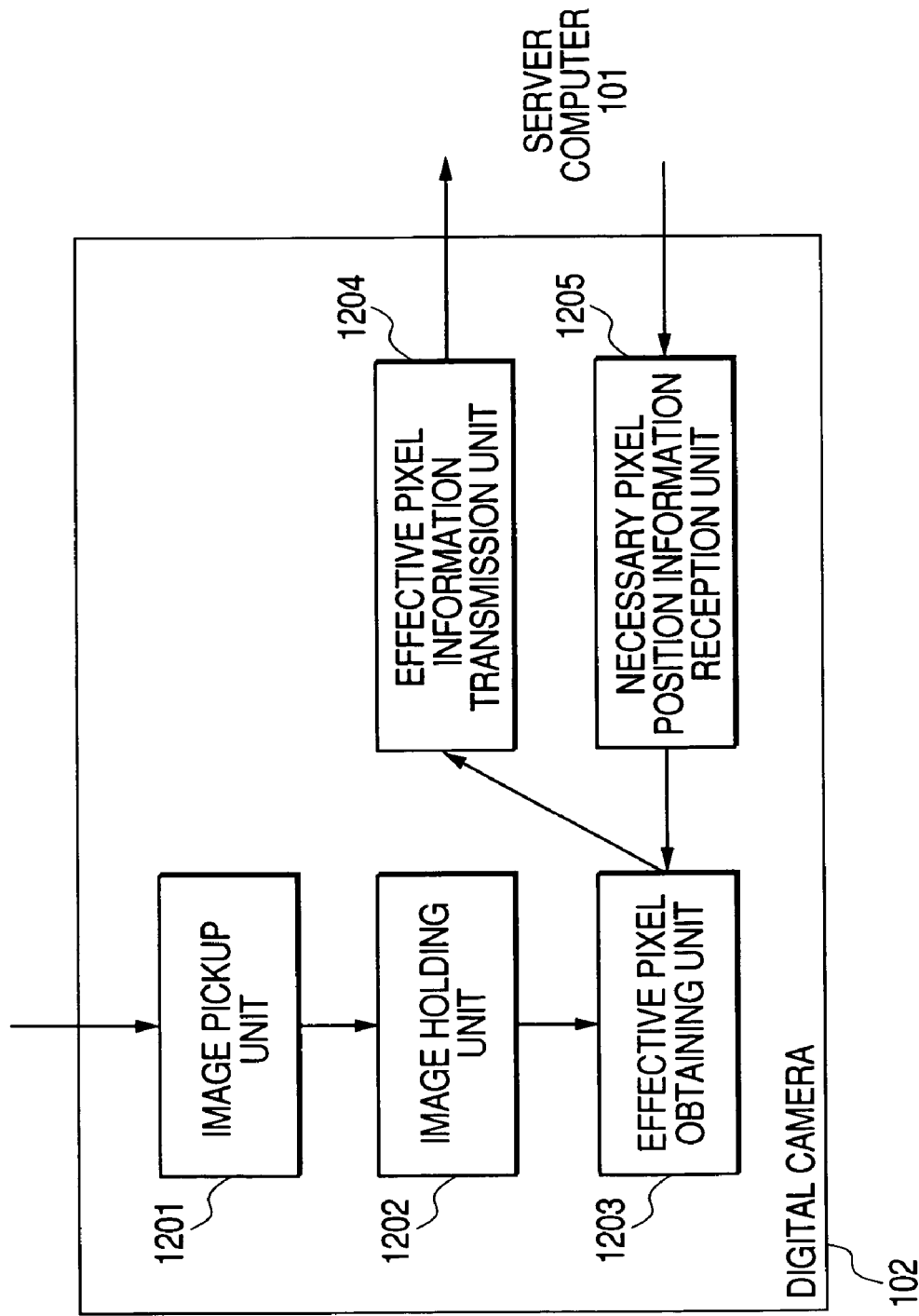
FIG. 12 is a block diagram showing a digital camera 102 according to the fourth embodiment of the present invention.

FIG. 12 is a block diagram showing the hardware structure of the digital camera 102 being one of lots of the cameras according to the present embodiment. In FIG. 12, numeral 1201 denotes an image pickup unit, and numeral 1202 denotes an image holding unit which holds and stores image data obtained by photographing an image. Numeral 1203 denotes an effective pixel obtaining unit which extracts pixel information corresponding to necessary pixel position information transmitted from the server computer 101, and numeral 1204 denotes an effective pixel information transmission unit which transmits the pixel information obtained by the effective pixel obtaining unit 1203 to the server computer 101 through the LAN 104. Numeral 1205 denotes a necessary pixel position information reception unit which receives and obtains the set necessary pixel position information from the server computer 101 through the LAN 104.

Here, it should be noted that the hardware structure and its operation of the client computer 103 are the same as those in the first embodiment, whereby the explanation thereof will be omitted.

Figure 13:
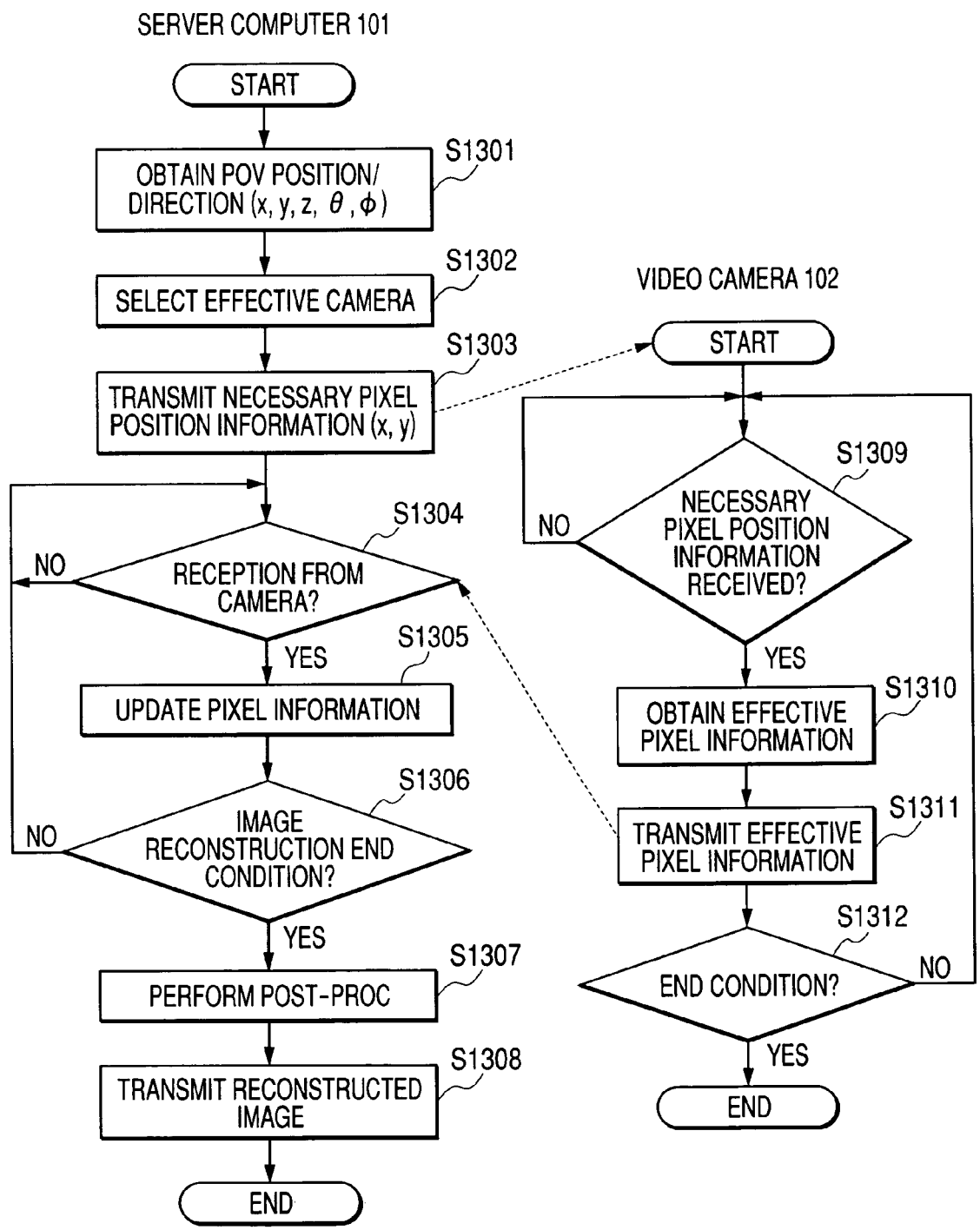
FIG. 13 is a flow chart showing an operation of the server computer 101 and an operation of the digital camera 102 according to the fourth embodiment of the present invention.

Hereinafter, an operation of the server computer 101 and an operation of the digital camera 102 according to the present embodiment will be explained with reference to a flow chart shown in FIG. 13. First, the server computer 101 obtains the POV position/direction information of the image intended to be reconstructed, from the client computer 103 (step S1301). In the server computer 101, the camera position/direction holding unit 1104 holds or stores the information concerning the respective positions and directions of lots of the cameras including the digital camera 102. Then, based on the held information and the set POV position/direction information of the image intended to be reconstructed, the server computer 101 judges according to the principle explained with reference to FIG. 10 whether or not each camera includes the pixel information (i.e., effective pixel information) effective for reconstructing the image viewed from the corresponding POV position and direction (step S1302). Subsequently, the server computer 101 calculates position information concerning the effective pixel included in each camera which has been judged to include the effective pixel information, similarly according to the principle explained with reference to FIG. 10. For example, in FIG. 10, it is calculated that the pixel b2 is the effective pixel with respect to the camera (B) and the pixel c1 is the effective pixel with respect to the camera (C). After then, the position information (x, y) of the calculated effective pixel is transmitted as the necessary pixel position information from the server computer 101 to the corresponding camera (step S1303).

When it is judged to include the effective pixel, the digital camera 102 comes to obtain the necessary pixel position information (x, y) from the server computer 101 (step S1309). Thus, the digital camera 102 performs image photographing, and thus obtains the pixel information corresponding to the necessary pixel position information (x, y) (step S1310). Then, the obtained pixel information is transmitted from the digital camera 102 to the server computer 101 (step S1311). As the result, it is unnecessary to transmit the entire image photographed by the digital camera 102 but it is necessary to transmit only the necessary pixel information, whereby a communication amount can be reduced. Incidentally, if the end condition is satisfied, the process ends in the digital camera 102 (step S1312).

Figure 8:
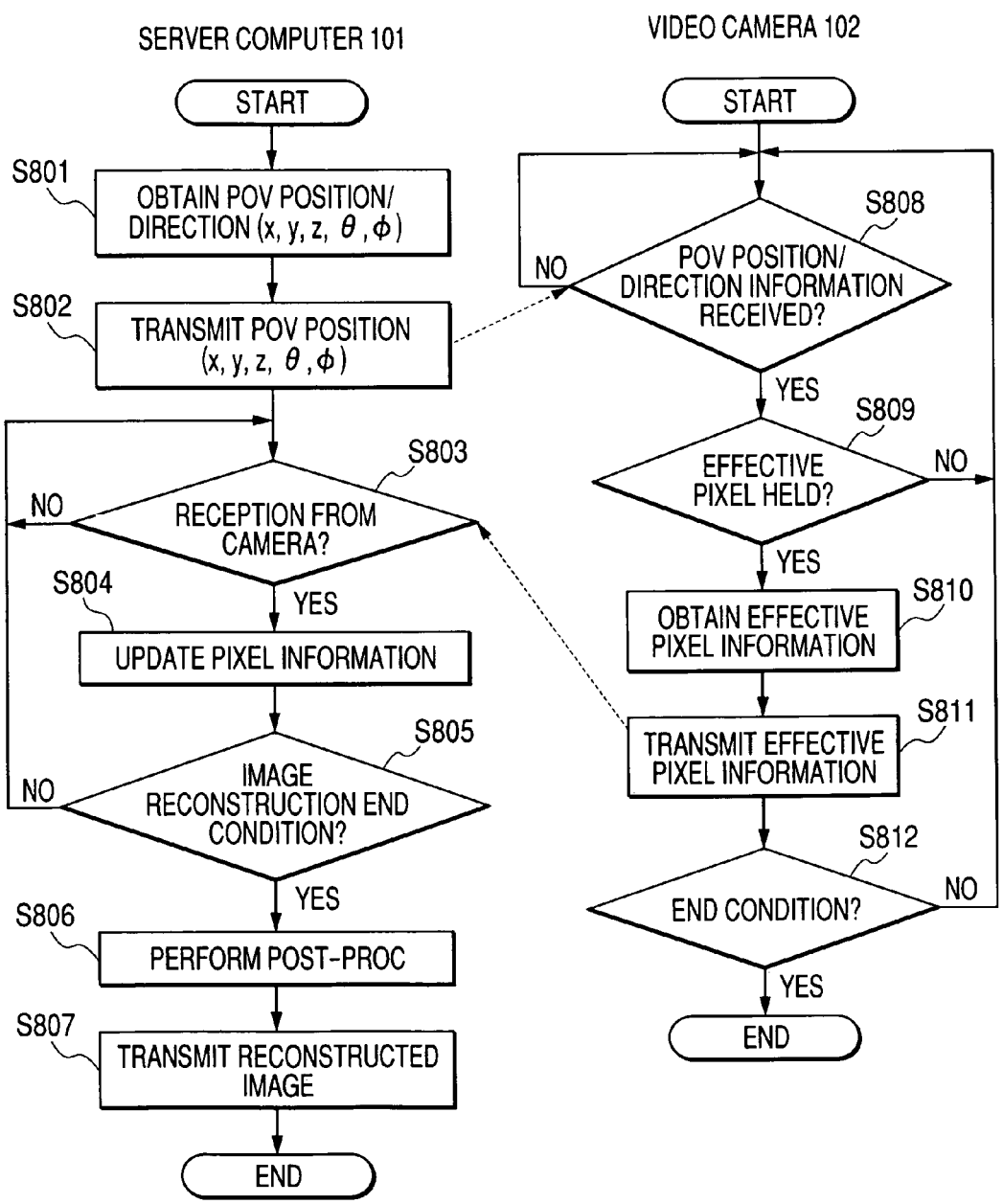
FIG. 8 is a flow chart showing an operation of the server computer 101 and an operation of the digital camera 102 according to the embodiment of the present invention.
Figure 9:
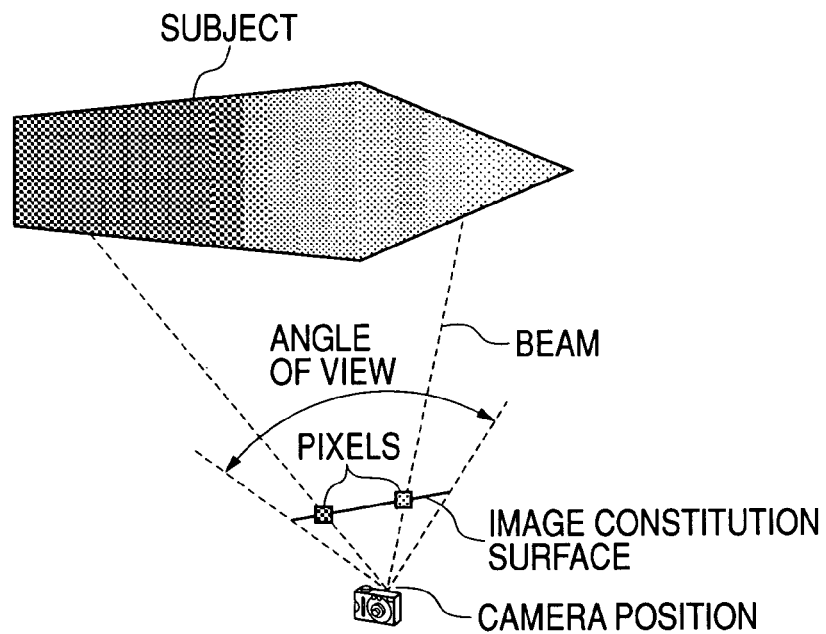
FIG. 9 is a diagram showing a camera model according to the embodiment of the present invention.

When the pixel information sent back from the digital camera 102 (i.e., lots of the cameras including the digital camera 102) is received (step S1304), the server computer 101 respectively performs the processes in steps S1304, S1305, S1306, S1307 and S1308 which are respectively the same as those in the steps S803, S804, S805, S806 and S807 of FIG. 8, thereby reconstructing the image viewed from the set POV position and direction.

Fifth Embodiment

In the above fourth embodiment, the still video viewed from the user's desired POV position and direction information based on the corresponding POV position/direction information is reconstructed. Besides, it is needless to say that also a moving image can be reconstructed and generated by applying the method as shown in the second embodiment to the third embodiment.

Sixth Embodiment

In the above fourth and fifth embodiments, the image reconstruction from the desired POV position and direction is requested from one client computer, i.e., one user. Meanwhile, in the present embodiment, it is possible for plural users to request the image reconstruction from the desired POV position and direction.

That is, in a case where necessary pixel position information (x, y) obtained from the POV position/direction information set from a user A (not shown) is transmitted from the server computer 101 to the selected digital camera 102, the server computer 101 adds a user identifier A to the necessary pixel position information (x, y, A). Then, when the necessary pixel position information (x, y, A) is received, the digital camera 102 adds the user identifier A to the effective pixel information to be transmitted, and then sends back the obtained information to the server computer 101. Subsequently, the server computer 101 gathers the effective pixel information including the same user identifier A, generates the image based on the gathered effective pixel information, and then transmits the reconstructed image to the client computer of the user A. Therefore, in the case where there are the plural users requesting the image reconstruction from the desired POV position and direction, it is possible to transmit the reconstructed image to these users.

Other Embodiments

Figure 14:
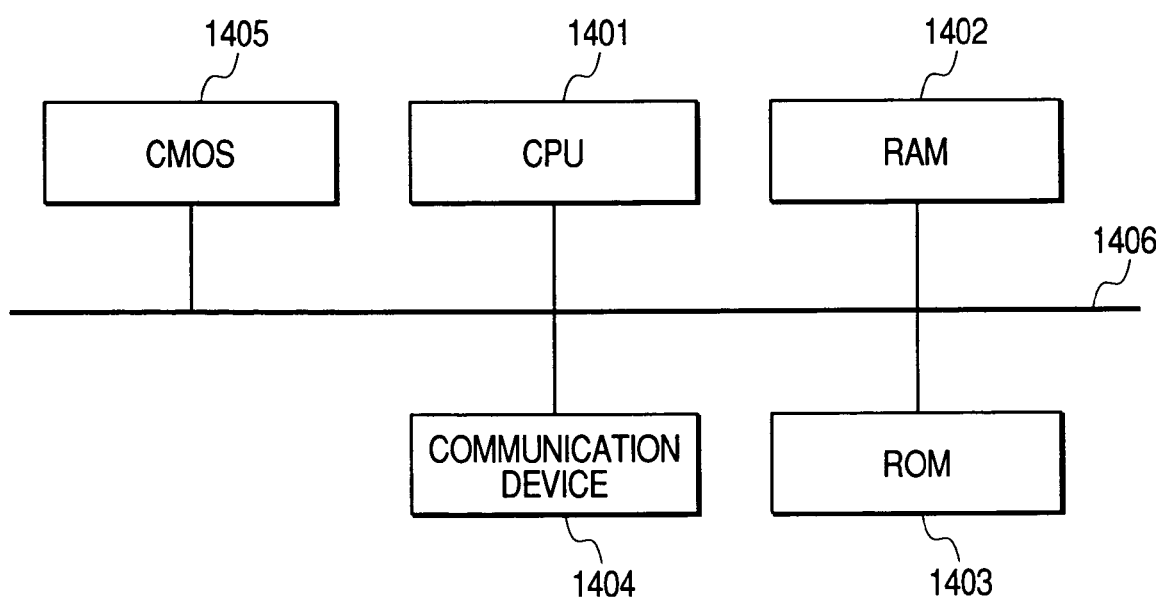
FIG. 14 is a block diagram showing the hardware structure of a digital camera 102 according to the seventh embodiment of the present invention.

In the above embodiments, the CCD is actually used when the image is photographed by the digital camera 102. However, a CMOS (complementary metal-oxide semiconductor) may be used instead of the CCD. In that case, the hardware structure of the digital camera 102 is shown in FIG. 14. In any case, when a CMOS 1405 is used, it is possible to obtain the pixel information of the effective pixel position without recording the entire photographed image on a RAM 1402, whereby a use amount of the RAM 1402 can be remarkably reduced. Incidentally, in FIG. 14, numerals 1401, 1403, 1404 and 1406 respectively denote a CPU, a ROM, a communication device, and a bus.

Moreover, in the above embodiments, the desired POV position and direction is set. In other words, the above embodiments are explained on the premise that the angle of view has a predetermined fixed value. However, the angle of view may be arbitrarily set. In that case, according to the principle shown in FIG. 10, if the angle of view of the image intended to be reconstructed is changed, the range including the digital cameras each having the effective pixel only changes, and the image can be generated or reconstructed based on the arbitrarily set angle of view.

Moreover, in the above embodiments, the desired POV position and direction is set. In other words, the above embodiments are explained on the premise that resolution has a predetermined fixed value. However, the resolution may be arbitrarily set. In that case, according to the principle shown in FIG. 10, to infer a pixel x of a virtual camera (X), an actual camera only has to exist on the line extending between the position of the pixel x and the POV position of the virtual camera (X). Here, if the requested resolution becomes high, more cameras are needed. There is actually a limit in the number of cameras which can be set, whereby the pixel of the virtual camera (X) which cannot be inferred directly from the pixel of the image actually photographed by the camera exists, and a probability of appearing such pixels increases if the requested resolution becomes high. However, even in such a case, the pixel which cannot be directly inferred from the pixel of the image actually photographed by the camera can be properly inferred by using the values of proximate pixels in some kind or another interpolation process.

Moreover, although the program is stored in the ROM in the above embodiments, the present invention is not limited to this. That is, the program may be stored in an arbitrary storage medium and some kind or another circuit.

Incidentally, the present invention may be applied to a system including plural devices, as well as to an apparatus consisting of a single device. It is needless to say that the object of the present invention may also be achieved by supplying a storage medium storing program codes of software for achieving the functions of the above embodiments to a system or an apparatus and causing a computer (or CPU or MPU) of the system or the apparatus to read and execute the program code stored in the storage medium. In that case, the program codes themselves which are read from the storage medium provide the functions of the above embodiments, and thus the storage medium which stores the program codes constitutes the present invention.

The storage medium for supplying the program codes may be, e.g., a flexible disk, a hard disk, an optical disk, a magnetooptical disk, a CD-ROM, a CD-R, a magnetic tape, a nonvolatile memory card, a ROM, or the like.

Moreover, it is needless to say that the functions of the above embodiments may be achieved not only by causing the computer to read and execute the program codes but also by causing, e.g., an operating system (OS) running on the computer to execute some or all of the actual processes on the basis of instructions of the program codes.

Furthermore, it is needless to say that the functions of the above embodiments may also be achieved by writing the program codes read from the storage medium to a memory of a function extension board inserted in the computer or a memory of a function expansion unit connected to the computer and causing a CPU of the function extension board or a CPU of the function expansion unit to execute some or all of the processes on the basis of instructions of the program codes.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method of reconstructing a new image at a POV (point of view) position and direction where no actual photographing is performed, from among plural images respectively photographed at different POV positions, comprising:
   a setting step of setting POV position and direction information of the new image;
   a transmission step of transmitting the POV position and direction information set in said setting step to plural photographing devices;
   a reception step of receiving effective pixel information of images according to the POV position and direction information respectively from the plural photographing devices; and
   a reconstruction step of reconstructing the new image based on the effective pixel information received in said reception step,
   wherein each of the plural photographing devices includes an extracting step of extracting an effective pixel from a photographed image, on the basis of the set POV position and direction information and POV position and direction information of the photographed image, and
   each effective pixel is a pixel corresponding to a light beam included in an image constitution surface according to the set POV position and direction information, wherein the light beam lies in a straight line connecting the set POV position according to the set POV position and direction information and the photographed image POV position according to the POV position and direction information of the photographed image.

2. An image processing method according to claim 1, wherein
   said reception step receives photographing timing information together with the effective pixel information, and
   said reconstruction step reconstructs the new image by using the effective pixel information having substantially the same photographing timing information.

3. An image processing method according to claim 2, wherein said reconstruction step reconstructs a moving image.

4. A computer-readable medium having a program stored thereon for achieving, by using a computer, an image processing method of reconstructing a new image at a POV (point of view) position and direction where no actual photographing is performed, from among plural images respectively photographed at different POV positions, said method comprising:
   a setting step of setting POV position and direction information of the new image;
   a transmission step of transmitting the POV position and direction information set in said setting step to plural photographing devices;
   a reception step of receiving effective pixel information of images according to the POV position and direction information respectively from the plural photographing devices; and
   a reconstruction step of reconstructing the new image based on the effective pixel information received in said reception step,
   wherein each of the plural photographing devices includes an extracting step of extracting an effective pixel from a photographed image, on the basis of the set POV position and direction information and POV position and direction information of the photographed image, and
   each effective pixel is a pixel corresponding to a light beam included in an image constitution surface according to the set POV position and direction information, wherein the light beam lies in a straight line connecting the set POV position according to the set POV position and direction information and the photographed image POV position according to the POV position and direction information of the photographed image.

5. An image processing method of reconstructing a new image at a POV (point of view) position and direction where no actual photographing is performed, from among plural images respectively photographed at different POV positions, comprising:
   a setting step of setting POV position and direction information of the new image;
   a holding step of holding information of respective positions and directions of plural cameras connected through a network;
   a selection step of selecting one of said plural cameras having an effective pixel necessary to reconstruct the new image, based on the POV position and direction information set in said setting step, the effective pixel being a pixel corresponding to a light beam included in an image constitution surface according to the set POV position and direction information, wherein the light beam lies in a straight line connecting the set POV position according to the set POV position and direction information and the photographed image POV position according to the POV position and information of the photographed image;
   a transmission step of transmitting, to the camera selected in said selection step, effective pixel position information of the selected camera;
   a reception step of receiving said effective pixel information according to the POV position and direction information respectively from the plural cameras; and
   a reconstruction step of reconstructing the new image based on the effective pixel information received in said reception step.

6. An image processing method according to claim 5, wherein
   said reception step receives photographing timing information together with the effective pixel information, and
   said reconstruction step reconstructs the new image by using the effective pixel information having substantially the same photographing timing information.

7. An image processing method according to claim 6, wherein said reconstruction step reconstructs a moving image.

8. A computer-readable medium having a program stored thereon for achieving, by using a computer, an image processing method of reconstructing a new image at a POV (point of view) position and direction where no actual photographing is performed, from among plural images respectively photographed at different POV positions, said method comprising:
   a setting step of setting POV position and direction information of the new image;
   a holding step of holding information of respective positions and directions of plural cameras connected through a network;
   a selection step of selecting one of said plural cameras having an effective pixel necessary to reconstruct the new image, based on the POV position and direction information set in said setting step, the effective pixel being a pixel corresponding to a light beam included in an image constitution surface according to the set POV position and direction information, wherein the light beam lies in a straight line connecting the set POV position according to the set POV position and direction information and the photographed image POV position according to the POV position and information of the photographed image;

a transmission step of transmitting, to the camera selected in said selection step, effective pixel position information of the selected camera;

a reception step of receiving said effective pixel information according to the POV position and direction information respectively from the plural cameras; and a reconstruction step of reconstructing the new image based on the effective pixel information received in said reception step.

9. An image processing apparatus of reconstructing a new image at a POV (point of view) position and direction where no actual photographing is performed, from among plural images respectively photographed at different POV positions, comprising:

a setting unit adapted to set POV position and direction information of the new image;

a transmission unit adapted to transmit the POV position and direction, information set by said setting unit to plural photographing devices;

a reception unit adapted to receive effective pixel information of images according to the POV position and direction information respectively from the plural photographing devices; and a reconstruction unit adapted to reconstruct the new image based on the effective pixel information received by said reception unit, wherein each of the plural photographing devices includes an extracting unit of extracting an effective pixel from a photographed image, on the basis of the set POV position and direction information and POV position and direction information of the photographed image, and each effective pixel is a pixel corresponding to a light beam included in an image constitution surface according to the set POV position and direction information, wherein the light beam lies in a straight line connecting the set POV position according to the set POV position and direction information and the photographed image POV position according to the POV position and direction information of the photographed image.

10. An image processing apparatus of reconstructing a new image at a POV (point of view) position and direction where no actual photographing is performed, from among plural images respectively photographed at different POV positions, comprising:

a setting unit adapted to set POV position and direction information of the new image;

a holding unit adapted to hold information of respective positions and directions of plural cameras connected through a network;

a selection unit adapted to select one of said plural cameras having an effective pixel necessary to reconstruct the new image, based on the POV position and direction information set by said setting unit, the effective pixel being a pixel corresponding to a light beam included in an image constitution surface according to the set POV position and direction information, wherein the light beam lies in a straight line connecting the set POV position according to the set POV position and direction information and the photographical image POV position according to the POV position and direction information of the photographed image;

a transmission unit adapted to transmit, to the camera selected by said selection unit, effective pixel position information of the selected camera;

a reception unit adapted to receive said effective pixel information according to the POV position and direction information respectively from the plural cameras; and a reconstruction unit adapted to reconstruct the new image based on the effective pixel information received by said reception unit.

* * * * *